(12) United States Patent
Moon et al.

(10) Patent No.: US 12,365,350 B2
(45) Date of Patent: Jul. 22, 2025

(54) AGRICULTURAL MACHINE HAVING ACCIDENT PREVENTION FUNCTION AND METHOD OF OPERATING SAME

(71) Applicant: INPLAB INC., Gimcheon-si (KR)

(72) Inventors: Yong Min Moon, Seoul (KR); Jung Hyo Lee, Gimcheon-si (KR); Min Gyu Kim, Gimcheon-si (KR)

(73) Assignee: INPLAB INC., Gimcheon-si (KR)

( * ) Notice: Subject to any disclaimer, the term of this patent is extended or adjusted under 35 U.S.C. 154(b) by 290 days.

(21) Appl. No.: 18/088,949

(22) Filed: Dec. 27, 2022

(65) Prior Publication Data

US 2024/0051551 A1 Feb. 15, 2024

(30) Foreign Application Priority Data

Aug. 10, 2022 (KR) .................. 10-2022-0100237

(51) Int. Cl.
*B60W 50/00* (2006.01)
*B60W 10/04* (2006.01)

(52) U.S. Cl.
CPC ........ *B60W 50/0098* (2013.01); *B60W 10/04* (2013.01); *B60W 2300/15* (2013.01); *B60W 2530/10* (2013.01); *B60W 2540/227* (2020.02)

(58) Field of Classification Search
CPC ......... B60W 50/098; B60W 2540/227; B60W 10/04; B60W 2300/15; B60W 2530/10
USPC .......................................................... 701/36
See application file for complete search history.

(56) References Cited

U.S. PATENT DOCUMENTS

| | | | | |
|---|---|---|---|---|
| 10,165,573 B2* | 12/2018 | Lee | ............... | H04W 72/1215 |
| 10,442,442 B2* | 10/2019 | Imaizumi | ............... | G06V 20/58 |
| 2023/0183942 A1* | 6/2023 | Tamura | ............... | E02F 9/26 |
| | | | | 715/771 |

FOREIGN PATENT DOCUMENTS

| | | |
|---|---|---|
| KR | 20-1998-0051146 U | 10/1998 |
| KR | 20-1999-0031931 U | 7/1999 |
| KR | 20-0343250 Y1 | 3/2004 |

* cited by examiner

*Primary Examiner* — Andrew Joseph Rudy
(74) *Attorney, Agent, or Firm* — Sughrue Mion, PLLC (57) ABSTRACT

An agricultural machine having an accident prevention function includes an agricultural machine body including a front wheel connected to an engine and a handle protruding rearward, an engine controller configured to control an operation of an engine, a cargo box fixed to an upper portion of a frame connected to a rear side of the body and configured to load cargo, a boarding part towed and moved by being connected to body and configured to provide a boarding seat on which a driver is seated, and an accident occurrence factor confirmation part configured to check whether an accident occurrence factor is present using a sensing signal for the cargo box when a seating detection signal is received from a boarding-part seating detector configured to detect whether a user is seated on the boarding part and provide a start disable or start enable signal to the engine controller.

6 Claims, 3 Drawing Sheets

AGRICULTURAL MACHINE HAVING ACCIDENT PREVENTION FUNCTION AND METHOD OF OPERATING SAME

CROSS-REFERENCE TO RELATED APPLICATION

This application claims priority to and the benefit of Korean Patent Application No. 2022-0100237, filed on Apr. 10, 2022, the disclosure of which is incorporated herein by reference in its entirety.

BACKGROUND

1. Field of the Invention

The present disclosure relates to an agricultural machine having an accident prevention function and a method of operating the same. More specifically, the present disclosure relates to an agricultural machine having an accident prevention function for blocking an engine start when an accident occurrence factor is present to prevent an accident, and a method of operating the same.

2. Discussion of Related Art

Agricultural machines are considered very important in reducing a high labor burden and a production cost in response to the decrease in the labor force in rural areas due to the shortage of labor and the aging population.

For example, as a result of the Korea Transportation Safety Authority's analysis of agricultural machine traffic accidents over the past five years (Year 2009 to 2013), the number of deaths has rapidly doubled from 5 people in 2009 to 99 people in 2013.

In addition, when the number of traffic accidents by accident type is compared with the total number of vehicle accidents, the rate of single-vehicle accidents is about six times higher than the total number of vehicle accidents. In addition, as specific types of accidents, overturning (35%), leaving the road (27%), and colliding with a workpiece (3%) due to driving at night, drunk driving, or over-operating a steering device appear in large numbers.

In particular, the fatality rate of agricultural machine accidents was more than nine times higher than that of general vehicle accidents (total 2.37 times and agricultural machine 2.4 times). This is because there is a high probability of multiple deaths when not only a user but also other passengers ride together due to the nature of agricultural machines without any safety devices.

In addition, after an agricultural machine accident, there are many cases where lifesaving is difficult due to a time delay caused by various conditions such as loss of consciousness and loss of contact. In particular, for accidents caused by the aging of farmers and fishermen and careless driving, their lives can be saved their life if an emergency number is calling a rescue center quickly. However, since rural roads are sparsely populated, a the person involved in the accident cannot be able to call the emergency number quickly contact the rescue center and may loses consciousness, which has a serious adverse effect on life.

SUMMARY OF THE INVENTION

The present disclosure is directed to an agricultural machine having an accident prevention function for blocking an engine start when an accident occurrence factor is present to prevent an accident, and a method of operating the same.

The present disclosure is also directed to an agricultural machine having an accident prevention function for preventing an accident due to overload by measuring a weight of a cargo box of an agricultural machine before the agricultural machine starts, determining whether the agricultural machine is overloaded, and allowing the agricultural machine to start according to a determination result, and a method of operating the same.

The present disclosure is also directed to an agricultural machine having an accident prevention function for blocking an operation of an agricultural machine when a driver consumes alcohol with a light meal during farming activity by measuring whether the driver riding the agricultural machine has consumed alcohol before the agricultural machine starts and allowing the agricultural machine to start according to a measured result, and a method of operating the same.

The problems to be solved by the present disclosure are not limited to those described above, and other problems that are not mentioned above should be clearly understood by those skilled in the art from the following description.

According to an aspect of the present disclosure, there is provided an agricultural machine having an accident prevention function, which includes an agricultural machine body including a front wheel connected to an engine and a handle protruding rearward, an engine controller configured to control an operation of an engine, a cargo box fixed to an upper portion of a frame connected to a rear side of the agricultural machine body and configured to load cargo, a boarding part towed and moved by being connected to the agricultural machine body and configured to provide a boarding seat on which a driver is seated, and an accident occurrence factor confirmation part configured to check whether an accident occurrence factor is present using a sensing signal for the cargo box when a seating detection signal is received from a boarding-part seating detector configured to detect whether a user is seated on the boarding part and provide a start disable signal or a start enable signal to the engine controller.

When whether the user is seated in a driver seat on the boarding part is detected, the accident occurrence factor confirmation part may measure a weight of cargo loaded in the cargo box according to weight information received from a weight sensor provided in the cargo box and check the accident occurrence factor.

The accident occurrence factor confirmation part may provide the start disable signal to the engine controller when the accident occurrence factor is present and provide the start enable signal to the engine controller when the accident occurrence factor is not present.

According to another aspect of the present disclosure, there is provided a method of operating an agricultural machine having an accident prevention function, which includes generating a seating detection signal when a driver is seated on the boarding part providing a boarding seat, which is connected to an agricultural machine body including a front wheel connected to an engine and a handle protruding rearward and is towed and moved, when the seating detection signal is received, checking whether an accident occurrence factor is present using a sensing signal for a cargo box, which is fixed to an upper portion of a fame connected to a rear side of the agricultural machine body and in which cargo is loaded, and generating a start disable signal or a start enable signal, and controlling an operation of the engine according to the start disable signal or the start enable signal.

The generating of the start disable signal or a start enable signal by checking whether the accident occurrence factor is present may include when whether the user is seated on the driver seat on the boarding part is detected, measuring a weight of cargo loaded in the cargo box according to weight information received from a weight sensor provided in the cargo box and checking the accident occurrence factor.

The controlling of the operation of the engine according to the start disable signal or the start enable signal may include when the accident occurrence factor is present, controlling the engine to not operate by generating the start disable signal, and when the accident occurrence factor is not present, controlling the engine to operate by generating the start enable signal.

BRIEF DESCRIPTION OF THE DRAWINGS

The above and other objects, features and advantages of the present disclosure will become more apparent to those skilled in the art by describing exemplary embodiments thereof in detail with reference to the accompanying drawings, in which.

DETAILED DESCRIPTION OF EXEMPLARY EMBODIMENTS

Advantages and features of the present disclosure and methods for achieving them will be made clear from embodiments described in detail below with reference to the accompanying drawings. However, the present disclosure is not limited to the exemplary embodiments described below and may be implemented in various other forms. The embodiments are provided such that the present disclosure will be thorough and complete and will fully convey the scope of the present disclosure to those skilled in the art to which the present disclosure pertains, and the present disclosure is defined by only the scope of the appended claims.

Unless defined otherwise, all terms (including technical and scientific terms) used herein may be used in a sense commonly understood by those skilled in the art to which the present disclosure pertains. In addition, terms which are defined in a commonly used dictionary are not ideally or excessively interpreted unless explicitly defined otherwise.

Terms used herein are for the purpose of describing the embodiments and are not intended to limit the present disclosure. In the present specification, the singular forms include the plural forms unless the context clearly dictates otherwise. It is noted that the terms "comprises" and/or "comprising" used herein does not exclude the presence or addition of one or more other components in addition to stated components.

Hereinafter, exemplary embodiments of the present disclosure will be described with reference to the accompanying drawings. In the drawings, the same reference numerals denote the same components.

Among the terms used herein, an "agricultural machine" includes a ride-on type agricultural machine used in farming. The ride-on type agricultural machine may be an agricultural machine used to grow and manage crops by a farm owner or farm manager. Examples of the agricultural machine vehicle include a tractor, a combine, a transplanting machine, a farm master, a transplanter, and the like.

Figure 1:
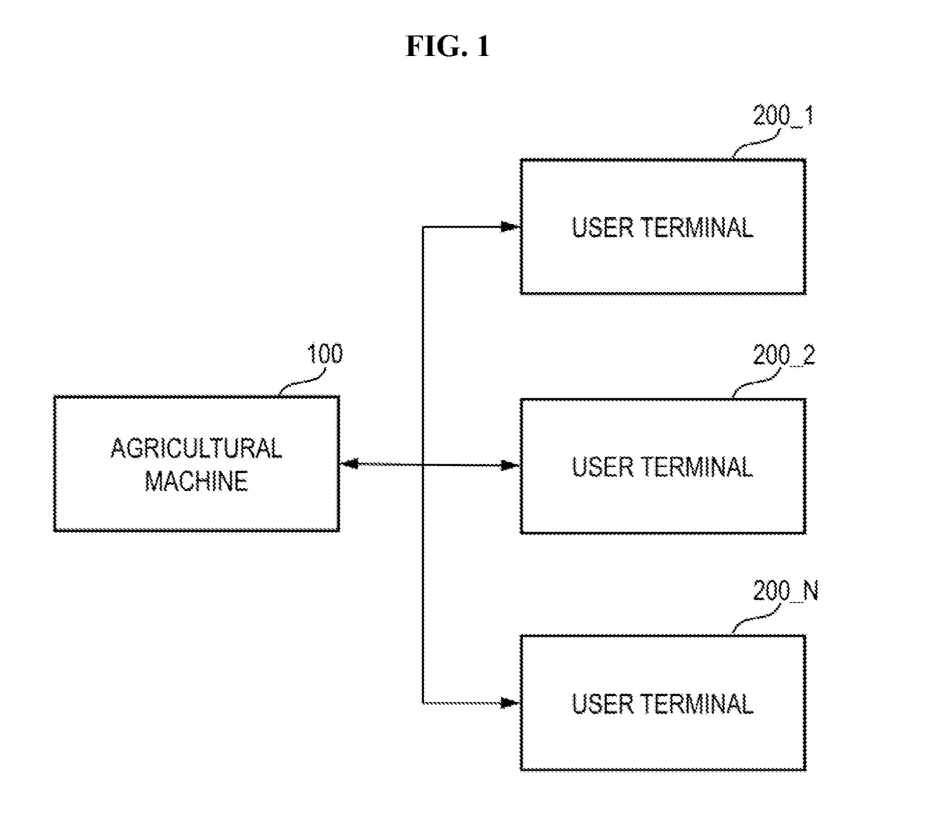
FIG. 1 is a network block diagram illustrating an agricultural machine system having an accident prevention function according to one embodiment of the present disclosure.

FIG. 1 is a network block diagram illustrating an agricultural machine system having an accident prevention function according to one embodiment of the present disclosure.

Referring to FIG. 1, the agricultural machine system having an accident prevention function includes an agricultural machine 100 having an accident prevention function and user terminals 200_1 to 200_N.

The agricultural machine 100 having an accident prevention function prevents an accident by blocking an engine start of an agricultural machine when an accident occurrence factor is present.

The agricultural machine 100 having an accident prevention function measures a blood alcohol level of a driver through a breathalyser 150 provided in a driver seat of the agricultural machine and compares the measured blood alcohol level with a set reference value to determine whether the driver drinks.

In this case, when exhaled alcohol is injected into a collector, two electrodes are electrochemically reacted and generate electric charges and a flow thereof, and the breathalyser 150 uses the principle of measuring the flow of electric charges and converting the measured flow into a blood alcohol level.

When a seating detection signal indicating the determination that the user seats in the driver seat is received, the agricultural machine 100 having an accident prevention function outputs a request for a sobriety test as an audio announcement. In addition, the agricultural machine 100 converts a blood alcohol level using an alcohol concentration input through the breathalyser 150, compares the converted blood alcohol level with the set reference value, and outputs audio start disable or enable announcement. The start disable or the start enable announcement may be output in other forms. For example, the announcement may be output in the form of light or vibrations.

Even during a process of performing the sobriety test through the breathalyser 150, the agricultural machine 100 having an accident prevention function continuously checks whether the seating detection signal is received. As a result of the check, when the seating detection signal is not input continuously or there is no signal input for a set time (e.g., two seconds), the agricultural machine 100 determines that the driver leaves the driver seat, is initialized, and outputs a request for a sobriety test as an audio announcement again.

As described above, when the breathalyser 150 determines that the agricultural machine 100 having an accident prevention function is start-enable, the agricultural machine 100 performs user authentication.

When a user image including a user authentication code is received from each of the user terminals 200_1 to 200_N, the agricultural machine 100 having an accident prevention function extracts the user authentication code from the user image. Thereafter, the agricultural machine 100 compares the extracted user authentication code with a pre-stored user authentication code and generates an authentication result.

In one example, the agricultural machine 100 having an accident prevention function analyzes pixels of the user image and extracts at least one halftone dot. Each halftone dot may consist of one or more dots (pixels). In this case, since the one or more dots constituting the halftone dot are expressed as pixel values similar to pixel values of the user image (that is, expressed as RGB colors above specific values or below specific values compared to the RGB colors of the pixels), the user cannot visually check whether the halftone dot is inserted in the user image. According to the example, the halftone dots may be implemented in different sizes according to user authentication codes. In addition, the size of the halftone dot may be varied according to the number of pixels used to generate the halftone dot.

Then, the agricultural machine 100 having an accident prevention function generates a user authentication code by analyzing the halftone dot extracted from the user image. More specifically, when a plurality of halftone dots are extracted from the user image, the agricultural machine 100 determines a binary value corresponding to each halftone dot on the basis of the number of dots (pixels) constituting each of the extracted halftone dots. To this end, a table of binary values per halftone dot may be referred to. The table includes the number of dots constituting the halftone dot and binary values corresponding to the halftone dot.

For example, as a result of referring to the above table, suppose that a binary value of a halftone dot consisting of four pixels is "1" and a binary value of a halftone dot consisting of eight pixels is "0." In addition, suppose that one halftone dot consisting of four pixels is one, and three halftone dots consisting of eight pixels are sequentially extracted from the user image. In this case, the agricultural machine 100 having an accident prevention function may sequentially combine "1," "0," "0", and "0," which are binary values corresponding to the four halftone dots extracted from the user image, to restore the user authentication code.

When the user authentication code is identical to the pre-stored user authentication code, the agricultural machine 100 having an accident prevention function determines that a corresponding user is a user who can use the agricultural machine and generates a user authentication result.

Therefore, the agricultural machine 100 having an accident prevention function controls the agricultural machine to start according to the user authentication result. That is, when it is determined that the user is an authenticated user on the basis of the user authentication result, the agricultural machine 100 having an accident prevention function controls the agricultural machine to start.

In addition, when an inclination of the agricultural machine in the operating data is greater than or equal to a critical inclination, the agricultural machine 100 having an accident prevention function compares location information of the agricultural machine with location information of the hazard area stored in a hazard area database (DB) and determines whether an accident has occurred according to a matching result of the comparison. To this end, the hazard area DB in which the location information of the hazard area is stored may be stored in the agricultural machine 100 having an accident prevention function.

As one example, when the inclination of the agricultural machine in the operating data is greater than or equal to a critical inclination and the location information of the agricultural machine does not correspond to the location information of the hazard area stored in the hazard area DB, it may be determined that the agricultural machine 100 having an accident prevention function moves from the road to a rice paddy or a field, that is, not an accident.

As another example, when the inclination of the agricultural machine in the operating data is greater than or equal to the critical inclination and the location information of the agricultural machine corresponds to the location information of the hazard area stored in the hazard area DB, the agricultural machine 100 having an accident prevention function determines that an accident situation is suspected and provides the suspected accident situation and the location information to the control server.

Therefore, when the location information is received from the agricultural machine 100 having an accident prevention function, the control server provides the location information of the agricultural machine 100 having an accident prevention function to a terminal device (i.e., navigation) of a vehicle located within a specific radius on the basis of the location information.

When a user authentication request message is received from the agricultural machine 100 having an accident prevention function, in response to a user manipulation, the user terminals 200_1 to 200_N each generate a user image by photographing a user riding in a boarding part 140 of the agricultural machine having an accident prevention function to provide the generated user image to the agricultural machine 100 having an accident prevention function.

In this case, the user terminals 200_1 to 200_N may each generate the user image and then generate a modified user image by inserting a halftone dot corresponding to the user authentication code (i.e., a mobile phone number or the like) into the user image.

The user authentication code is a code consisting of a combination of binary values (i.e., "0" and "1").

Since one or more dots constituting the halftone dot are expressed as pixel values similar to pixel values of the user image (that is, expressed as RGB colors above specific values compared to the RGB colors of the pixels), the user cannot visually check whether the halftone dot is inserted in the user image.

According to the example, the halftone dots may be implemented in different sizes according to user authentication codes, and the size of the halftone dot may be varied according to the number of pixels used to generate the halftone dot.

Therefore, when the user image is generated, the user terminals 200_1 to 200_N may each convert pixel values of different numbers of pixels into values that are greater or less than or equal to specific values compared to an original pixel value according to the user authentication code on the basis of the pixel value of the user image and insert the user authentication code.

For example, as a result of referring to a binary value table per halftone dot, suppose that a binary value of a halftone dot consisting of four pixels is "1" and a binary value of a halftone dot consisting of eight pixels is "0." In this case, when a binary value of the user authentication code is "1," the user terminals 200_1 to 200_N each convert four pixels into a value that is greater or less than or equal to a specific value on the basis of the pixel value of the user image. In addition, when a binary value of the user authentication code is "0," the user terminals 200_1 to 200_N may each insert the user authentication code by converting eight pixels into a value that is greater or less than or equal to a specific value on the basis of the pixel value of the user image.

Figure 2:
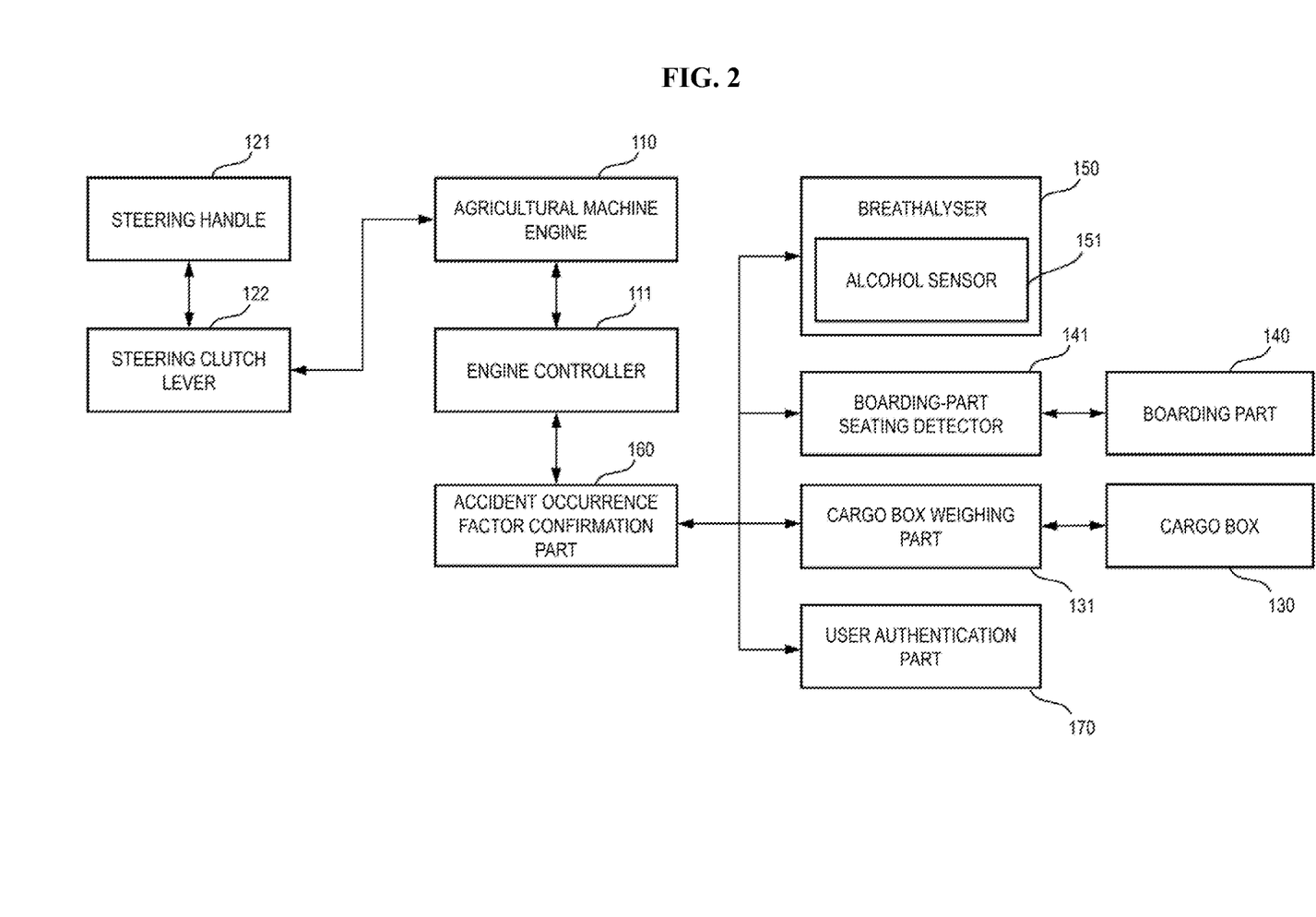
FIG. 2 is a block diagram for describing an internal structure of an agricultural machine accident prevention device according to one embodiment of the present disclosure.

FIG. 2 is a block diagram for describing an internal structure of an agricultural machine accident prevention device according to one embodiment of the present disclosure.

Referring to FIG. 2, the agricultural machine 100 having an accident prevention function includes an agricultural machine engine 110, an agricultural machine body having a front wheel connected to the agricultural machine engine 110 and a handle 120 protruding rearward, and a cargo box 130 fixed to an upper portion of a frame connected to a rear side of the agricultural machine body. In this case, the handle 120 includes a steering handle 121 and a steering clutch lever 122.

In addition, the agricultural machine 100 includes the boarding part 140 which is connected to the agricultural machine body to move in tow and which provides a boarding seat on which the driver can is seated, and the cargo box 130 in which a loading space for loading a tow wheel and cargo is formed.

The steering handle 121 is provided in the agricultural machine body, and the driver holds the steering handle 121 with both hands to steer.

The steering clutch lever 122 is provided below of the steering handle 121 to allow a pulling operation and disconnects power of wheels to change a direction. That is, when the user shifts the steering clutch lever 122 in a specific direction, power of a wheel in a direction opposite to the shift direction of the steering clutch lever 122 is disconnected so that a wheel in a specific direction is rotated.

A cargo box weighing part 131 is provided in the cargo box 130 to measure and provide a weight of cargo loaded on the cargo box 130.

The breathalyser 150 is provided in the boarding part 140 of the agricultural machine and measures a blood alcohol level of the driver. In addition, the breathalyser 150 compares the measured blood alcohol level with a set reference value to determine whether the driver drinks.

The breathalyser 150 includes an alcohol sensor 151 configured to measure an alcohol concentration according to breath of the driver. When a seating detection signal is input from the boarding-part seating detector 141, the breathalyser 150 converts the blood alcohol level using the alcohol concentration. Then, the breathalyser 150 compares the converted blood alcohol level with the set reference value and provides the comparison result to an accident occurrence factor confirmation part 160.

When exhaled alcohol is injected into a collector, two electrodes are electrochemically reacted and generate electric charges and a flow thereof, and the alcohol sensor 151 uses the principle of measuring the flow of electric charges and converting the measured flow into a blood alcohol level.

In this case, in addition to the alcohol sensor 151, various sobriety test parts may be replaced in the breathalyser 150, and this degree of a design change also falls within the scope of the present disclosure.

When the seating detection signal is input from the boarding-part seating detector 141, the breathalyser 150 outputs a request for a sobriety test as an audio announcement. In addition, the breathalyser 150 converts the blood alcohol level using the alcohol concentration input through the breathalyser 150, compares the converted blood alcohol level with the set reference value, and outputs audio start disable or enable announcement.

Even in the process of performing the sobriety test, the breathalyser 150 continuously checks whether the seating detection signal is input from the boarding-part seating detector 141. As a result of the check, when the seating detection signal is not input continuously from the boarding-part seating detector 141 or there is no signal input for a set time (e.g., two seconds), the breathalyser 150 determines that the driver leaves the driver seat, is initialized, and outputs a request for a sobriety test as an audio announcement again.

When the seating detection signal is received from the boarding-part seating detector 141 configured to detect whether the user is seated on the boarding part 140, the accident occurrence factor confirmation part 160 checks whether an accident occurrence factor is present and provides a start disable signal or a start enable signal to an engine controller 111.

The accident occurrence factor confirmation part 160 provides a start disable signal or a start enable signal to the engine controller 111 according to the sobriety test result received from the breathalyser 150, the weight of the cargo box received from the cargo box weighing part 131, and the user authentication result received from the user authentication part 170.

First, when whether the user is seated on the driver seat on the boarding part is detected, the accident occurrence factor confirmation part 160 measures a weight of cargo loaded in the cargo box according to weight information received from a weight sensor provided in the cargo box and checks the accident occurrence factor.

When the weight of the load loaded in the cargo box is less than or equal to a predetermined weight, the accident occurrence factor confirmation part 160 controls the breathalyser 150 to check whether the driver drinks. When the weight of the cargo is greater than the predetermined weight, the accident occurrence factor confirmation part 160 outputs a voice requesting to reduce the weight of the loaded cargo and, simultaneously, provides a start disable signal the engine controller 111.

Then, the accident occurrence factor confirmation part 160 receives whether the driver drinks from the breathalyser 150. When it is determined that a state of the user is in a drinking status on the basis of the received information, the accident occurrence factor confirmation part 160 outputs a voice indicating that the starting cannot begin due to the drinking status and, simultaneously, provides the start disable signal to the engine controller 111. When it is determined that the state of the user is not in the drinking status on the basis of the received information, the accident occurrence factor confirmation part 160 requests user authentication to the user authentication part 170.

When it is determined that the user is a pre-registered user according to the user authentication result, the accident occurrence factor confirmation part 160 provides the start enable signal to the engine controller 111.

In addition, when an inclination of the agricultural machine in the operating data is greater than or equal to a critical inclination, the agricultural machine 100 having an accident prevention function compares location information of the agricultural machine with location information of the hazard area stored in a hazard area DB and determines whether an accident has occurred according to a matching result of the comparison.

As one example, when the inclination of the agricultural machine in the operating data is greater than or equal to a critical inclination and the location information of the agricultural machine does not correspond to the location information of the hazard area stored in the hazard area DB, it may be determined that the agricultural machine 100 having an accident prevention function moves from the road to a rice paddy or a field, that is, not an accident.

As another example, when the inclination of the agricultural machine in the operating data is greater than or equal to the critical inclination and the location information of the agricultural machine corresponds to the location information of the hazard area stored in the hazard area DB, the agricultural machine 100 having an accident prevention function determines that an accident situation is suspected and provides the suspected accident situation and the location information to the control server. Therefore, when the location information is received from the agricultural machine 100 having an accident prevention function, the control server provides the location information of the agricultural machine 100 having an accident prevention function to a terminal device (i.e., navigation) of a vehicle located within a specific radius on the basis of the location information.

When a user image including the user authentication code is received from each of the user terminals 200_1 to 200_N, the user authentication part 170 extracts the user authentication code from the user image, compares the extracted user authentication code with the pre-stored user authentication code, and provides the authentication result to the engine controller 111.

In one example, the user authentication part 170 analyzes pixels of the user image to extract a halftone dot. In this case, since one or more dots constituting the halftone dot are expressed as pixel values similar to pixel values of the user image (that is, expressed as RGB colors above specific values or below specific values compared to the RGB colors of the pixels), the user cannot visually check whether the halftone dot is inserted in the user image. In this case, the halftone dots may be implemented in different sizes according to user authentication codes, and the size of the halftone dot may be varied according to the number of pixels used to generate the halftone dot.

Then, the user authentication part 170 generates a user authentication code by analyzing the halftone dot extracted from the user image.

For example, suppose that a binary value of a halftone dot consisting of four pixels is "1" and a binary value of a halftone dot consisting of eight pixels is "0." In this case, the user authentication part 170 determines the binary value as one of "0" and "1" according to the size of the halftone dot extracted from the user image. Then, the user authentication code may be restored by combining the determined values.

When the user authentication code is identical to the pre-stored user authentication code, the user authentication part 170 determines that a corresponding user is a user who can use the agricultural machine and provides the user authentication result to the engine controller 111.

Figure 3:
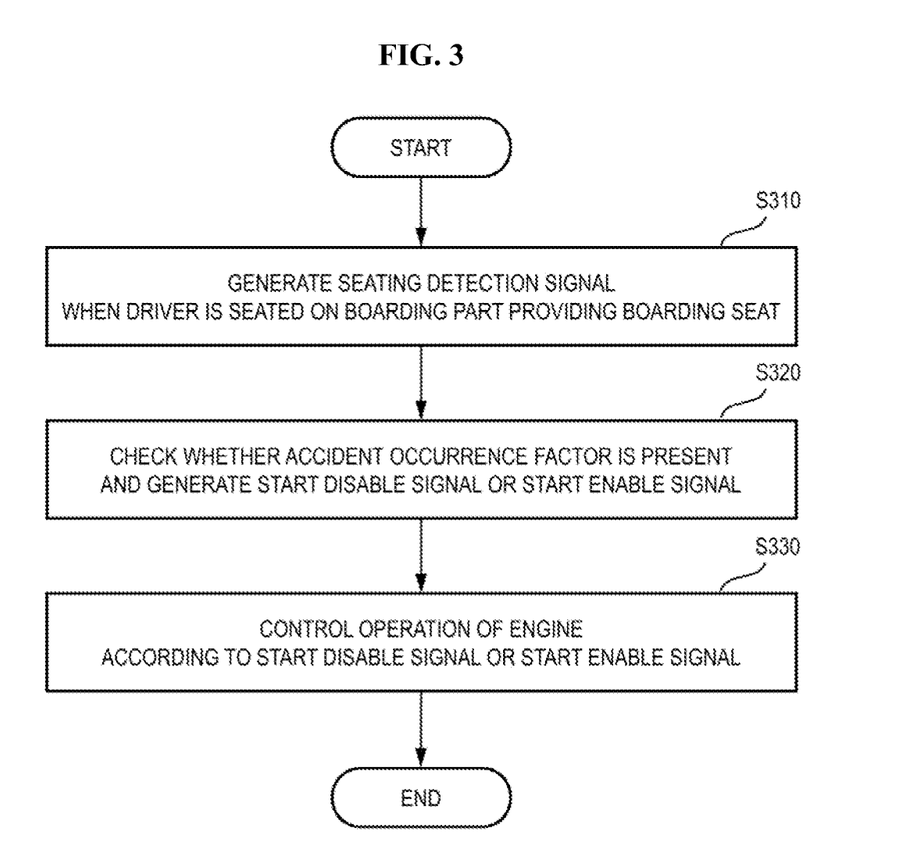
FIG. 3 is a flowchart illustrating a method of operating an agricultural machine having an accident prevention function according to the present disclosure.

FIG. 3 is a flowchart illustrating a method of operating an agricultural machine having an accident prevention function according to the present disclosure.

Referring to FIG. 3, the agricultural machine 100 having an accident prevention function generates a seating detection signal when a driver is seated on the boarding part providing a boarding seat, which is connected to the agricultural machine body including a front wheel connected to an engine and a handle protruding rearward and is towed and moved (S310).

When the seating detection signal is received, the agricultural machine 100 having an accident prevention function checks whether an accident occurrence factor is present using a sensing signal for a cargo box, which is fixed to an upper portion of a fame connected to a rear side of the agricultural machine body and in which cargo is loaded, and generates a start disable signal or a start enable signal (S320).

The agricultural machine 100 having an accident prevention function controls an operation of the engine according to the start disable signal or the start enable signal (S330).

Although not shown in FIG. 3, when an inclination of the agricultural machine in the operating data is greater than or equal to a critical inclination, the agricultural machine 100 having an accident prevention function compares location information of the agricultural machine with location information of the hazard area stored in a hazard area DB and determines whether an accident has occurred according to a matching result of the comparison.

As one example, when the inclination of the agricultural machine in the operating data is greater than or equal to a critical inclination and the location information of the agricultural machine does not correspond to the location information of the hazard area stored in the hazard area DB, it may be determined that the agricultural machine 100 having an accident prevention function moves from the road to a rice paddy or a field, that is, not an accident.

As another example, when the inclination of the agricultural machine in the operating data is greater than or equal to the critical inclination and the location information of the agricultural machine corresponds to the location information of the hazard area stored in the hazard area DB, the agricultural machine 100 having an accident prevention function determines that an accident situation is suspected and provides the suspected accident situation and the location information to the control server. Therefore, when the location information is received from the agricultural machine 100 having an accident prevention function, the control server provides the location information of the agricultural machine 100 having an accident prevention function to a terminal device (i.e., navigation) of a vehicle located within a specific radius on the basis of the location information.

The embodiments of the present disclosure have been described with reference to FIGS. 1 to 3. In the descriptions with reference to FIGS. 1 to 3, an example of a case in which the sizes of the halftone dots are implemented differently according to the user authentication code has been described. According to another example, in response to the user authentication code, one or more among the number of halftone dots, a size of each halftone dot, a color of each halftone dot, a pattern of each halftone dot, an interval between the halftone dots (a minimum interval and a maximum interval), and an arrangement form the halftone dots may be implemented differently.

Meanwhile, the disclosed embodiments may be implemented the form of a recording medium storing commands executable by a computer. The commands may be stored in the form of program code and, when executed by a processor, may generate a program module to perform the operations of the disclosed embodiments. The recording medium may be implemented as a computer-readable recording medium.

Examples of the computer-readable recording medium include all kinds of recording media storing instructions which are decipherable by a computer. For example, there may be a read only memory (ROM), a random access memory (RAM), a magnetic tape, a magnetic disk, a flash memory, an optical data storage device, and the like.

In addition, the computer-readable recording medium may be provided in the form of a non-transitory storage medium. Here, the "non-temporary storage medium" only means that it is a tangible device and does not contain signals (e.g., electromagnetic waves), and this term does not distinguish between a case in which data is semi-permanently stored in a storage medium and a case in which data is temporarily stored. For example, the "non-temporary storage medium" may include a buffer in which data is temporarily stored.

According to one example, the methods according to various embodiments disclosed herein may be included and provided in a computer program product. The computer program product may be traded between a seller and a buyer as a commodity. The computer program product is distributed in the form of machine-readable recording media (e.g., a compact disc read only memory (CD-ROM)), distributed through application stores (e.g., Play Store™), directly distributed between two user devices (e.g., smartphones), or distributed online (e.g., downloaded or uploaded). In the case of the online distribution, at least a portion of a computer program product (e.g., a downloadable app) may be stored at least temporarily or generated temporarily in a device-readable recording medium such as a manufacturer's server, an application store server, or a relay server's memory.

According to embodiments of the present disclosure, when an accident occurrence factor is present, an engine start of an agricultural machine is blocked so that an accident can be prevented.

According to embodiments of the present disclosure, an accident due to overload can be prevented by measuring a weight of a cargo box of an agricultural machine before the agricultural machine starts, determining whether the agricultural machine is overloaded, and allowing the agricultural machine to start according to a determination result.

According to embodiments of the present disclosure, an operation of the agricultural machine can be blocked when a driver consumes alcohol liquor with a light meal during farming activity by measuring whether the driver riding the agricultural machine is drunk before the agricultural machine starts and allowing the agricultural machine to start according to a measured result.

Embodiments according to the present disclosure have been described with reference to the accompanying drawings. It will be apparent to those skilled in the art that various changes and modifications may be made without departing from the spirit and scope of the present invention. Therefore, it should be understood that the above-described embodiments are not restrictive but illustrative in all aspects.

What is claimed is:

1. An agricultural machine having an accident prevention function, the agricultural machine comprising:
   an agricultural machine body including an engine;
   an engine controller configured to control an operation of the engine;
   a cargo box connected to the agricultural machine body and configured to load cargo;
   a boarding part connected to the agricultural machine body;
   a boarding-part seating detector configured to detect whether a user is seated on the boarding part; and
   an accident occurrence factor confirmation part configured to check whether an accident occurrence factor is present using a sensing signal for the cargo box when a seating detection signal is received from the boarding-part seating detector and provide a start disable signal or a start enable signal to the engine controller,
   wherein the agricultural machine is configured to:
   based on an inclination of the agricultural machine being greater than or equal to a critical inclination, compare location information of the agricultural machine with location information of a hazard area stored in a hazard area database (DB),
   based on the location information of the agricultural machine not corresponding to the location information of the hazard area stored in the hazard area DB as a result of the comparison, determine that the agricultural machine is not in an accident situation, and
   based on the location information of the agricultural machine corresponding to the location information of the hazard area stored in the hazard area DB as the result of the comparison, determine that an accident situation of the agricultural machine is suspected and provide the suspected accident situation and the location information of the agricultural machine to a server.

2. The agricultural machine of claim 1, wherein, based on the user being seated on the boarding part, the accident occurrence factor confirmation part measures a weight of cargo loaded in the cargo box and checks the accident occurrence factor.

3. The agricultural machine of claim 1, wherein the accident occurrence factor confirmation part provides the start disable signal to the engine controller when the accident occurrence factor is present and provides the start enable signal to the engine controller when the accident occurrence factor is not present.

4. A method of operating an agricultural machine having an accident prevention function, the method comprising:
   generating a seating detection signal when a driver is seated on a boarding part connected to an agricultural machine body including an engine;
   when the seating detection signal is received, checking whether an accident occurrence factor is present using a sensing signal for a cargo box connected to the agricultural machine body and in which cargo is loaded, and generating a start disable signal or a start enable signal; and
   controlling an operation of the engine according to the start disable signal or the start enable signal,
   wherein the method further comprises:
   based on an inclination of the agricultural machine being greater than or equal to a critical inclination, comparing location information of the agricultural machine with location information of a hazard area stored in a hazard area database (DB),
   based on the location information of the agricultural machine not corresponding to the location information of the hazard area stored in the hazard area DB as a result of the comparison, determining that the agricultural machine is not in an accident situation, and
   based on the location information of the agricultural machine corresponding to the location information of the hazard area stored in the hazard area DB as the result of the comparison, determining that an accident situation of the agricultural machine is suspected and providing the suspected accident situation and the location information of the agricultural machine to a server.

5. The method of claim 4, wherein the generating of the start disable signal or the start enable signal by checking whether the accident occurrence factor is present includes, based on the user is being seated on the boarding part, measuring a weight of cargo loaded in the cargo box and checking the accident occurrence factor.

6. The method of claim 4, wherein the controlling of the operation of the engine according to the start disable signal or the start enable signal includes:

when the accident occurrence factor is present, controlling the engine to not operate by generating the start disable signal; and when the accident occurrence factor is not present, controlling the engine to operate by generating the start enable signal.

* * * * *